Aug. 10, 1943.  J. P. JOHNSON  2,326,462
PRESSURE REGULATOR VALVE
Filed Aug. 14, 1940

INVENTOR.
JAMES P. JOHNSON
BY
O. Melbourne Green
ATTORNEY.

Patented Aug. 10, 1943

2,326,462

UNITED STATES PATENT OFFICE 2,326,462

PRESSURE REGULATOR VALVE

James P. Johnson, Shaker Heights, Ohio

Application August 14, 1940, Serial No. 352,557

7 Claims. (Cl. 137—153)

This invention relates to improvements in pressure regulator valves and more particularly to those for use in hydraulic systems on aircraft although other adaptations will be obvious to those skilled in the art and the invention is, therefore, in no manner so restricted.

With all of the instrumentalities which are hydraulically actuated on aircraft at the present time high pressure systems, with pressure requirements up to 1000 pounds per square inch and more, are necessary so as to take care of maximum requirements and for this reason their design should be strong, light in weight and more efficient in operation. It is, therefore, one of the objects of the present invention to provide a pressure regulator valve which is light in weight, compact and simple in construction, efficient in operation, and inexpensive to manufacture and assemble.

A further object of the present invention is to provide a movable valve member having a relatively large valve head to afford passage of large quantities of fluid thereby with a minimum movement of the valve member.

Another object of the present invention is to provide a spring-loaded semi-balanced movable valve member affording use of a relatively light tensioned spring for effectively maintaining high pressure in the system.

Another object of the present invention resides in a novel adjustment of the spring tension and its manner of securement.

With the objects above indicated, and other objects hereinafter explained in view, my invention consists in the construction and combination of elements hereinafter described and claimed.

Referring to the drawing.

Figure 5:
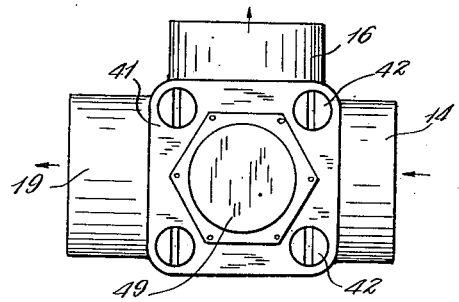
Figure 5 is a top plan view of the regulator valve.
Figure 1:
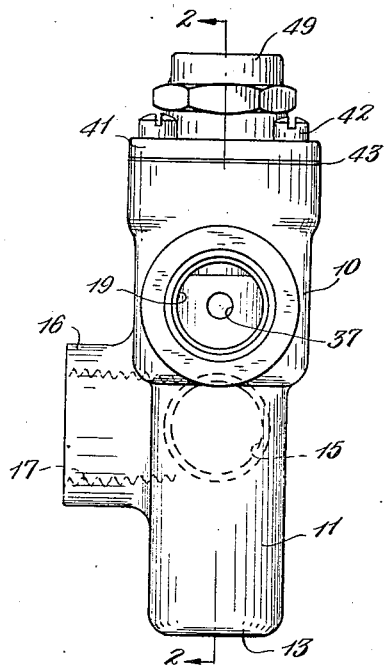
Figure 1 is a side elevational view of a pressure regulator valve embodying the present invention.

In the drawing I have illustrated a pressure regulator valve designed especially for use in hydraulic systems on aircraft but the valve is capable of other uses and the invention is not therefore to be limited in this respect. The regulator valve, indicated generally by the numeral 10, comprises a housing 11 preferably in the form of an aluminum casting although other suitable light weight material might be employed. The housing is relatively long with respect to its transverse dimension and has a centrally disposed bore generally designated by the numeral 12, extending inwardly from its upper end and terminating at its lower end adjacent an end wall 13. The housing 10 is provided with a lateral projection 14 disposed upwardly from the lower end of the housing and has a tapped opening 15 communicating at its inner end with the bore 12. This opening functions in the present instance, as the fluid inlet opening and is adapted for connection with an engine driven pump from which fluid is discharged under pressure in a manner well understood in the art. The housing 10 is further provided with a lateral extension 16 disposed on another side of the housing and in the present instance positioned approximately 90 degrees with respect to the position of the inlet opening 15. This extension 16 is likewise provided with a tapped opening 17 communicating at its inner end with the bore 12 and functions as the fluid outlet opening being adapted for connection with the pressure line of the hydraulic system. It will be further noted that the inlet opening 15 and outlet opening 17 are always in communication. The housing 10 is further provided with a lateral extension 18 projecting outwardly on the side opposite from the extension 14 but disposed at a slightly higher level and this extension is provided with a tapped opening 19 which communicates at its inner end with the bore 12. This opening 19 functions as a fluid return outlet opening and is adapted for connection with the fluid reservoir to afford return of fluid under conditions to be later described.

The circular bore 12 consists of a lower portion 20 of small diameter which extends upwardly from the end wall 13 to adjacent the lower end of the inlet opening 15 and communicates with a portion 21 of slightly larger diameter extending upwardly to adjacent the lower end of the outlet opening 19. A portion 22 of slightly larger diameter communicates at its lower end with the portion 21 and extends upwardly beyond the upper end of the outlet opening 19 communicating with a portion 23 of larger diameter extending inwardly from the outer end of the housing to provide an open outer end.

Figure 2:
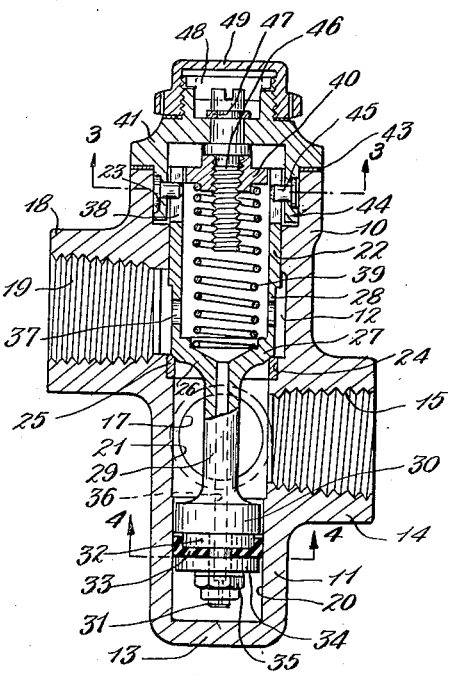
Figure 2 is a vertical transverse sectional view taken on line 2—2 in Figure 1 and showing details of the structure embodying the invention.
Figure 3:
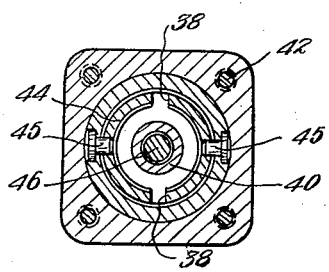
Figure 3 is a transverse sectional view taken on line 3—3 in Figure 2 and showing details for preventing relative rotative movement between the outer end of the valve member and the housing in which it is slidably mounted.
Figure 4:
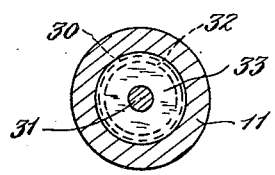
Figure 4 is a transverse sectional view taken on line 4—4 in Figure 2 and showing details of the piston end of the valve member.

At the upper end of the portion 21 of the bore is a counterbore 24 of relatively larger diameter in which an annular valve seat ring 25 of relatively large diameter is mounted, the inner peripheral wall providing a continuation of the inner peripheral wall of the bore 21 and the upper face terminating tangentially with the lower end of the opening 19 as more clearly shown in Figure 2. A valve member, indicated generally by the numeral 26, is slidably mounted within the centrally disposed bore 12 and is preferably formed of steel or other suitable material. The valve member comprises a valve head 27 of relatively large diameter engageable with the inner upper edge of the valve seat 25 for controlling the flow of fluid thereby and has an upwardly extending tubular skirt 28 slidably mounted in the portion 22 of the circular bore, the outer end of the skirt terminating adjacent the outer end of the housing. By using a relatively large diameter valve head a large quantity of fluid can flow past the head with a very small movement of the valve member.

As previously pointed out it is an object of the invention to provide a semi-balanced valve member and while any suitable means may be employed for accomplishing the desired result a simple and efficient construction is shown in the drawing. The valve member has a connecting rod 29 of relatively small diameter extending downwardly and terminating in a piston head 30 of suitable diameter to slidably fit within the upper end of the portion 20 of the bore. The piston head has a centrally disposed stem 31 extending downwardly and its outer end is exteriorly screwthreaded. A washer 32 is disposed upon the stem and engages the under side of the piston head, the diameter of the washer being sufficiently less than the diameter of the piston head to provide an annular groove adapted to receive a piston ring 33 of rubber or other suitable material thus effecting a tight seal. The ring 33 is conveniently secured by providing a transverse connecting portion having a central opening through which the stem projects and a lower metal disc 34 securely abuts the lower face of the ring and has a central opening through which the stem projects. A nut 35 is threadably mounted on the end of the stem and by proper turning the disc, ring, and washer are rigidly secured to the piston head for slidable movement therewith. The area of the valve head 27 effective to the pressure of the incoming fluid is, in the present case approximately 10 percent, greater than the area of the piston ring 33 effective to the same fluid pressure thus resulting in an unbalanced condition. The result effected by the unbalanced condition of the valve member is that it is actuated by a pressure differential thus permitting the use of a pre-loading spring of relatively light tension in comparison to the high line pressure which it controls. This has the decided advantage of greatly reducing the size of the valve pre-loading means and in obtaining a finer degree of adjustment. The relationship between the valve head and the piston may be suitably varied to regulate any line pressure desired.

In order that the valve will operate freely and effectively the lower end of the central bore 24 in which the piston reciprocates should be vented to the low pressure side of the system and in the present instance a simple manner comprises a central opening 36 which extends through the stem 34, the piston 30, the connecting rod 29 and valve head 27 communicating with the interior of the skirt 28. The skirt 28 is provided with a plurality of transverse openings 37 so disposed that communication is established between the return outlet opening 19 and the outer end of the opening 36, the openings 37 being spaced apart relatively. Any fluid, therefore, which is in the lower end of the bore is forced through the opening 36, by the downward movement of the piston, and passes through the openings 37 and outwardly through the return outlet opening 19. The upper end of the skirt 28 is provided with a plurality of slots 38 which extend inwardly parallel to the axis. There are four of these slots shown and they are spaced relatively in angular relation. The slots are provided to receive a means, later to be described, which prevents relative rotation between the valve member and the housing in which it is slidably mounted.

For pre-loading the valve member a spring of very light tension can be utilized due to the unbalanced condition of the valve member. It is possible to regulate a high pressure system, up to 1000 pounds per square inch, with the use of a spring having only a few pounds pressure. By providing a relatively large valve head and a relatively large valve seat, a large quantity of fluid can be passed by the valve with a minimum of relative movement and, for this reason, a much finer variation and control can be effected with the use of a small coil spring. For preloading the valve member, as shown in the drawing, a coil spring 39 is disposed coaxially within the skirt 28 and has its lower end seated upon the adjacent portion of the valve head while its outer end is seated on a retaining member 40 which is afforded axial movement within the skirt to properly tension the spring.

A cover member 41, of aluminum or other suitable material, is mounted upon the open end of the housing and removably secured by a plurality of screws 42, more clearly shown in Figure 5. A gasket 43 is disposed between the adjacent faces of the cover and housing to form a fluid tight seal. The cover member 41 has a depending flange 44 which fits within the adjacent portion 23 of the central bore and is provided with transverse openings diametrically disposed, to receive the shank portion 45 of headed pins secured against accidental displacement by the adjacent portion of the housing. The shank portions 45 of the headed pins project inwardly and are disposed within adjacent slots 38 of the skirt thus preventing relative rotation of the valve member with respect to the housing. The cover member 41 has a closed outer end provided with a central opening through which an adjusting screw 46 projects, the lower end of the adjusting screw being exteriorly screwthreaded and extending through a central screwthreaded opening provided in the retainer opening 40. An integral collar is provided on the adjusting screw and engages the adjacent face of the cover member while a spring snap ring 47 is mounted on the adjusting screw and engages the outer face of the cover member to afford rotation of the adjusting member but to prevent longitudinal movement. The outer end of the adjusting screw has a slot to receive a screw-driver or other tool by which it may be turned to suitably adjust the tension of the spring 39. A securing blade 48 has a portion disposed in the slot in the end of the adjusting screw and lateral extensions adapted to be positioned in recesses formed on the outer end of the cover member. The outer end of the cover member has an exteriorly screw-threaded extension on which a cap 49 is threadably mounted to prevent tampering and accidental change of the spring adjustment.

In the operation of the pressure regulator the inlet opening 15 is connected with the outlet side of an engine driven pump while the outlet opening 17 is suitably connected with the system pressure line in a well known manner. The fluid return opening 19 is connected to the fluid reservoir in a well known manner. As the pump operates fluid is forced through the inlet opening 15 and flows out through the outlet opening 17 to the pressure line of the hydraulic system until the desired pressure has been effected. As long as the pressure in the system remains normal there is a continuous flow of fluid through the system to the reservoir and back to the pump. If the pressure in the system increases above the normal pressure for any reason and that increase is greater than the pre-loading on the valve member, the latter is raised from its seat and fluid flows by the valve to the return outlet opening 19 where it is conveyed to the reservoir. As long as the pressure in the system is in an excess of that for which the regulator is set, fluid will continue to flow past the valve and out the return opening but when the pressure is reduced to normal or below, the valve will immediately seat itself and the operating pressure in the system wil be reestablished.

While I have described the preferred embodiment of the invention it is to be understood that I am not to be limited thereto inasmuch as changes and modifications may be resorted to without departing from the spirit of the invention as defined in the appended claims.

What is claimed is:

1. A pressure regulator valve comprising: a housing having a bore therein and a fluid inlet opening and a fluid outlet opening communicating with said bore for effecting unrestricted communication therebetween, said housing further having a fluid return outlet opening communicating with said bore and provided with an annular valve seat positioned between said return outlet opening and said fluid outlet opening; a semi-balanced valve member slidably disposed in said bore and having a valve head engageable with said valve seat for controlling the flow of excess fluid thereby, said valve member being further provided with a connected piston head of relatively smaller diameter than said valve head to effect a pressure-area differential therebetween, said piston head being slidably mounted in said bore and disposed at the opposite side of said fluid outlet opening whereby said valve head is removable from its seat by any increase in line pressure greater than said pressure-area differential; and means for pre-loading said valve member in proportion to said pressure-area differential for normally maintaining said valve head in engagement with its seat as long as the line pressure remains below that for which said valve member is pre-loaded.

2. A pressure regulator valve comprising: a housing having a bore therein and a fluid inlet opening and a fluid outlet opening communicating with said bore for effecting unrestricted communication therebetween, said housing further having a fluid return outlet opening communicating with said bore and provided with an annular valve seat positioned between said return outlet opening and said fluid outlet opening; a semi-balanced valve member slidably disposed in said bore and having a valve head engageable with said valve seat for controlling the flow of excess fluid thereby, said valve member being further provided with a connected piston head of relatively smaller diameter than said valve head to effect a pressure-area differential therebetween, said piston head being slidably mounted in said bore and disposed at the opposite side of said fluid outlet opening whereby said valve head is removable from its seat by any increase in line pressure greater than said pressure-area differential, said valve member being further provided with a tubular skirt extending outwardly from the other side of said valve head; a coiled spring for pre-loading said valve member in proportion to said pressure-area differential and disposed longitudinally within said skirt with its inner end in abutment with the adjacent side of said valve head for normally maintaining the latter in engagement with its seat as long as the line pressure remains below that for which said valve member is pre-loaded; and means adjustably mounted on said housing and operatively associated with the outer end of said spring for varying the tension of the latter.

3. A pressure regulator valve comprising: a housing having a bore therein and a fluid inlet opening and a fluid outlet opening communicating with said bore for effecting unrestricted communication therebetween, said housing further having a fluid return outlet opening communicating with said bore and provided with an annular valve seat positioned between said return outlet opening and said fluid outlet opening; a semi-balanced valve member slidably disposed in said bore and having a valve head engageable with said valve seat for controlling the flow of excess fluid thereby, said valve member being further provided with a connected piston head of relatively smaller diameter than said valve head to effect a pressure-area differential therebetween, said piston head being slidably mounted in said bore and disposed at the opposite side of said fluid outlet opening whereby said valve head is removable from its seat by any increase in line pressure greater than said pressure-area differential, said valve member being further provided with a tubular skirt extending outwardly from the other side of said valve head; cooperating means on said housing and skirt to prevent relative rotation but affording relative slidable movement therebetween; a coiled spring for pre-loading said valve member in proportion to said pressure-area differential and disposed longitudinally within said skirt with its inner end in abutment with the adjacent side of said valve head for normally maintaining the latter in engagement with its seat as long as the line pressure remains below that for which said valve member is pre-loaded; and means adjustably mounted on said housing and operatively associated with the outer end of said spring for varying the tension of the latter.

4. A pressure regulator valve comprising: a housing having a bore therein and a fluid inlet opening and a fluid outlet opening communicating with said bore for effecting unrestricted communication therebetween, said housing further having a fluid return outlet opening communicating with said bore and provided with an annular valve seat positioned between said return outlet opening and said fluid outlet opening; a semi-balanced valve member slidably disposed in said bore and having a valve head engageable with said valve seat for controlling the flow of excess fluid thereby, said valve member being further provided with a connected piston head of relatively smaller diameter than said valve head to effect a pressure-area differential therebetween, said piston head being slidably mounted in said bore and disposed at the opposite side of said fluid outlet opening whereby said valve head is removable from its seat by any increase in line pressure greater than said pressure-area differential; means in said valve member affording communication between the end of said bore beyond said piston head and said outlet return opening; and means for pre-loading said valve member in proportion to said pressure-area differential for normally maintaining said valve head in engagement with its seat as long as the line pressure remains below that for which said valve member is pre-loaded.

5. A pressure regulator valve comprising: a housing having a bore therein and a fluid inlet opening and a fluid outlet opening communicating with said bore for effecting unresricted communication therebetween, said housing further having a fluid return outlet opening communicating with said bore and provided with an annular valve seat of relatively large diameter positioned between said return outlet opening and said fluid outlet opening; a semi-balanced valve member slidably disposed in said bore and having a valve head of relatively large diameter engageable with said valve seat for controlling the flow of excess fluid thereby, said valve head requiring a minimum amount of movement for passing a large volume of fluid thereby, said valve member being further provided with a connected piston head of relatively smaller diameter than said valve head to effect a pressure-area differential therebetween, said piston head being slidably mounted in said bore and disposed at the opposite side of said fluid outlet opening whereby said valve head is removable from its seat by any increase in line pressure greater than said pressure-area differential; and relatively light means for pre-loading said valve member in proportion to said pressure-area differential for normally maintaining said valve head in engagement with its seat as long as the line pressure remains below that for which said valve member is pre-loaded.

6. A pressure regulator valve comprising: a housing having in common communication a fluid inlet opening adapted for connection with a variable speed fluid pump and a fluid outlet opening adapted for connection with a fluid pressure line in which a constant predetermined pressure is to be maintained, said housing further having a fluid return opening adapted for connection with a fluid reservoir and a valve seat disposed between said return opening and said fluid outlet opening; a semi-balanced valve member slidably mounted in said housing and having a valve head engageable with said valve seat for controlling the flow of fluid thereby in excess of that required for maintaining the line pressure, said valve member being further provided with a connected piston head in spaced relation to said valve head and disposed upon the opposite side of said fluid outlet opening whereby both said piston head and valve head are subjected to the pressure of the incoming fluid, said piston head being of relatively smaller diameter than said valve head to effect a pressure-area differential responsive to increases in line pressure; and means for pre-loading said valve member in proportion to said pressure-area differential for normally maintaining said valve head in engagement with said valve seat as long as the line pressure remains below that for which the valve member is pre-loaded.

7. A pressure regulator valve comprising: a housing having in common communication a fluid inlet opening adapted for connection with a variable speed fluid pump and a fluid outlet opening adapted for connection with a fluid pressure line in which a constant predetermined pressure is to be maintained, said housing further having a fluid return opening adapted for connection with a fluid reservoir and a valve seat disposed between said return opening and said fluid outlet opening; a semi-balanced valve member slidably mounted in said housing and having a valve head engageable with said valve seat for controlling the flow of fluid thereby in excess of that required for maintaining the line pressure, said valve member being further provided with a connected piston head in spaced relation to said valve head and disposed upon the opposite side of said fluid outlet opening whereby both said piston head and valve head are subjected to the pressure of the incoming fluid, said piston head being of relatively smaller diameter than said valve head to effect a pressure-area differential responsive to increases in line pressure; means for pre-loading said valve member in proportion to said pressure-area differential for normally maintaining said valve head in engagement with said valve seat as long as the line pressure remains below that for which the valve member is pre-loaded; and means for varying the force exerted by said pre-loading means.

JAMES P. JOHNSON.